H. E. HAMILTON.
STAND VALVE TAP.
APPLICATION FILED MAY 25, 1918.

1,276,756.

Patented Aug. 27, 1918.

Witness

Inventor
H. E. Hamilton
By C. A. Snow & Co.
Attorneys

UNITED STATES PATENT OFFICE.

HARRY E. HAMILTON, OF BRIDGEPORT, ILLINOIS.

STAND-VALVE TAP.

1,276,756.  Specification of Letters Patent.  Patented Aug. 27, 1918.

Application filed May 25, 1918. Serial No. 236,565.

*To all whom it may concern:*

Be it known that I, HARRY E. HAMILTON, a citizen of the United States, residing at Bridgeport, in the county of Lawrence and State of Illinois, have invented a new and useful Stand-Valve Tap, of which the following is a specification.

The subject of the present invention is a valve tap intended for use in conjunction with stand pipe valves.

The main object of the invention is the provision of a valve tap which may be attached to the operating valve of a pump and engaged with the stand valve when desired.

Another object of the invention is the provision of a valve tap with means for pounding down or seating the stand valve.

A further object of the invention is the provision of means for normally retaining the tap out of engagement with the valve.

The invention also contemplates generally improving the construction and enhancing the utility of valve taps.

With the foregoing and other objects in view which may hereinafter more fully appear, the invention resides in the combination and arrangement of parts and in the details of construction hereinafter more fully described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1:
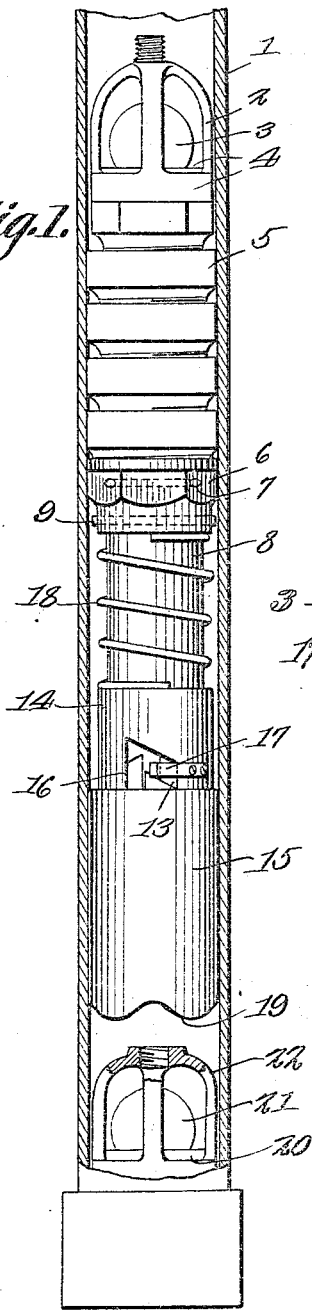
Figure 1 is a view in elevation of a tap constructed in accordance with the invention, a fragment of the pump mechanism to which it is applied being shown partly in elevation and partly in section.
Figure 2:
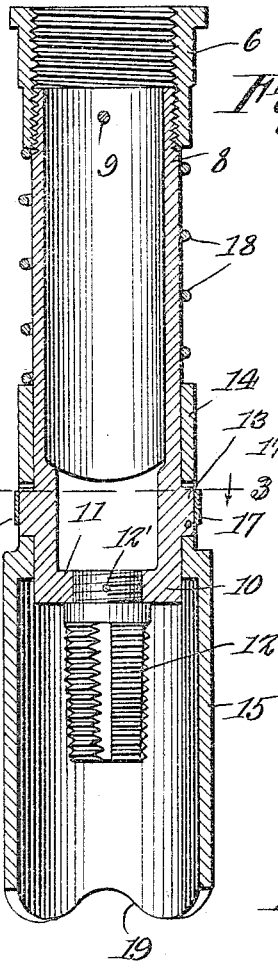
Fig. 2 is a view in longitudinal section of the tap.
Figure 3:
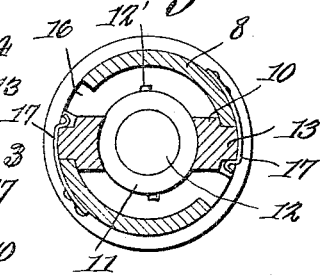
Fig. 3 is a cross section taken on the line 3—3 of Fig. 2.
Figure 4:
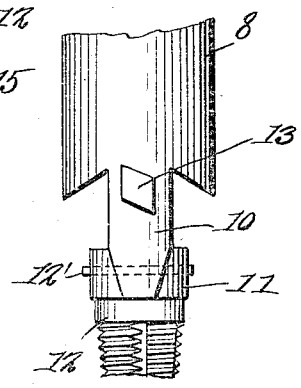
Fig. 4 is a view in elevation of a fragmentary detail.

Referring to the drawing by numerals of reference:—

The usual stand pipe or working barrel of a pump is indicated by the numeral 1 and within the pipe the working valve is reciprocable. The working valve consists of a cage 2, within which is loosely confined the ball valve 3 which is adapted to rest on its seat in the member 4. Threaded or otherwise secured below the member 4 are the usual cups 5.

Threaded to the lowermost cup 5 is a coupling nut 6 which may be secured or locked in place by a pin 7 to prevent the nut accidentally unscrewing from the cup 5. The coupling nut 6 serves to connect a tubular member 8 to the working valve, the upper end of this member being threaded into the nut and locked thereto, if desired, by a diametrically disposed pin 9, the parts being apertured for its reception.

The tubular member 8 is formed at its lower end to provide a preferably integral stirrup 10 the cross bar of which is enlarged, as at 11, and apertured to receive the connecting element of a tap 12 which may be locked in place by means of the pin or key 12′. The side bars or arms of the stirrup are formed with lugs 13 which take into bayonet joint, or offset, slots 16 which are formed in the reduced portion 14 of a tubular member 15. The offset or angled portions of the slots 16 are overlapped by latching springs 17 which are secured in any suitable manner to the portion 14 and the free or latching ends of these springs are bent to take over the lugs 13 and to yieldingly retain the same in the angled portions of the slots.

A coiled spring 18 encircles the tubular member 8 and is confined between the lower end of the coupling nut 6 and the upper end of the reduced portion 14 of the tubular member 15, and this spring serves to retain the tubular member 15 in its lowermost position, and also aids in retaining the lugs 13 normally in the angled portions of the slots 16.

The periphery of the lower end of the member 15 is scalloped, as indicated at 19 to engage with the cage or spider of the stand valve and lock the member 15 against rotation relative to the valve.

The stand pipe is of any usual form and consists of the valve seat 20 upon which is seatable downwardly the ball valve 21, the said ball valve confined within the cage 22.

In practice the invention is operated in the following manner:—

The D which is usually screwed on the lower end of the working valve is removed and the stand pipe tap substituted, the coupling nut 6 being threaded onto the lower end of the working valve. The tap is normally in the position shown in Fig. 1 with the lugs 13 in the angled portions of the slots 16, and the tubular member 15 so projected as to extend below the end of the tap 12 and so retain it from contact with the stand valve. With the parts in this position the tap may be used for the purpose of pounding the stand valve down upon its seat, the member 15 engaging or striking the cage 22 during such operation.

When it is desired to remove the stand valve, the rod is lowered to bring the lower end of the member 15 into engagement with the cage 22 of the stand valve. The projections of the scalloped end of the member 15 will then engage between the bars of the cage 22 and, by rotating the rod, the lugs 13 will be released from the latching springs 17 and brought to a position to enter the vertical portion of the slots 16. With the parts in this position the rod is thrust downwardly, sliding the tubular member 8 into the member 15 against the force of the spring 18. This brings the tap 12 into position to be screwed into the threaded opening of the cage 22 and, by further revolution of the rod, the tap is engaged with the cage so that by withdrawing the rod the valve may be withdrawn.

Having thus described the invention, what is claimed as new and sought by Letters Patent, is:—

1. The combination with a pump including a stand valve, and a working valve; of a member secured to and depending from the working valve, a tap depending from said member, a sleeve slidable on the member and normally projecting below the tap, and yielding means for holding the sleeve in its normal position.

2. The combination with a pump including a stand valve having a threaded opening, and a working valve; of a member secured to and depending from the working valve, lugs projecting from said member, a tap secured to and depending from the member, a sleeve slidable on the member and having angled slots for the reception of the lugs, the sleeve normally projecting below the tap, and means for holding the sleeve in its normal position, said means yielding to permit the tap to engage the stand valve.

3. The combination with a pump including a stand valve, a cage on the stand valve having a threaded opening, and a working valve; of a member secured to and depending from the working valve, lugs on the member, a tap secured to and depending from the member, a sleeve slidable on the member, said sleeve having angled slots for the reception of the lugs, means for yieldingly latching the lugs in the angled portions of the slots, the said sleeve normally projecting below the tap, means for holding the sleeve in its normal position, and projections on the lower end of the sleeve and engageable with the cage to hold the sleeve whereby to release the lugs to engage the tap with the cage.

In testimony that I claim the foregoing as my own, I have hereto affixed my signature in the presence of two witnesses.

HARRY E. HAMILTON.

Witnesses:
JAMES BARDOR,
M. J. POWELL.

Copies of this patent may be obtained for five cents each, by addressing the "Commissioner of Patents, Washington, D. C."